(12) United States Patent
Keefer

(10) Patent No.: US 11,305,612 B2
(45) Date of Patent: Apr. 19, 2022

(54) COMBUSTION CHAMBER ASSEMBLY UNIT

(71) Applicant: Eberspächer Climate Control Systems GmbH & Co. KG, Esslingen (DE)

(72) Inventor: Jörg Keefer, Weinstadt (DE)

(73) Assignee: EBERSPÄCHER CLIMATE CONTROL SYSTEMS GMBH, Esslingen am Neckar (DE)

( * ) Notice: Subject to any disclaimer, the term of this patent is extended or adjusted under 35 U.S.C. 154(b) by 283 days.

(21) Appl. No.: 16/676,705

(22) Filed: Nov. 7, 2019

(65) Prior Publication Data
US 2020/0148034 A1 May 14, 2020

(30) Foreign Application Priority Data
Nov. 8, 2018 (DE) ...................... 10 2018 127 863.2

(51) Int. Cl.
| | |
|---|---|
| B60H 1/02 | (2006.01) |
| F23D 3/40 | (2006.01) |
| F23N 5/26 | (2006.01) |
| B60H 1/00 | (2006.01) |
| B60H 1/14 | (2006.01) |

(52) U.S. Cl.
CPC ................. B60H 1/02 (2013.01); F23D 3/40 (2013.01); F23N 5/265 (2013.01); B60H 2001/00114 (2013.01); B60H 2001/146 (2013.01)

(58) Field of Classification Search
CPC ............. B60H 1/02; B60H 1/2203; B60H 2001/00114; B60H 2001/146; B60H 2001/2271; B60H 2001/2284; F23D 3/40; F23D 2202/00; F23N 5/265; F23N 2241/14; F23Q 13/00; F23Q 7/08; F23Q 21/00; F23C 99/001; F23C 5/08; F23C 2900/99003
See application file for complete search history.

(56) References Cited

U.S. PATENT DOCUMENTS

| | | | |
|---|---|---|---|
| 4,230,448 A | 10/1980 | Ward et al. | |
| 5,370,525 A | 12/1994 | Gordon | |
| 6,581,581 B1 * | 6/2003 | Bebich | F02P 23/045 123/536 |

(Continued)

FOREIGN PATENT DOCUMENTS

| | | |
|---|---|---|
| DE | 19914941 C1 | 5/2000 |
| DE | 102004002246 A1 | 8/2005 |

(Continued)

*Primary Examiner* — Emmanuel E Duke
(74) *Attorney, Agent, or Firm* — McGlew and Tuttle, P.C.

(57) ABSTRACT

A combustion chamber assembly unit for a fuel-operated vehicle heater includes a combustion chamber housing, a combustion chamber formed in the combustion chamber housing, an evaporator medium for the absorption of liquid fuel and for the discharge of fuel vapor into the combustion chamber, and a heating/ignition device for heating the evaporator medium or/and for igniting a mixture of fuel and combustion air formed in the combustion chamber. The heating/ignition device includes at least one radiation source for the emission of electromagnetic radiation into the combustion chamber and at least one absorption body for the absorption of electromagnetic radiation emitted into the combustion chamber.

20 Claims, 2 Drawing Sheets

(56) References Cited

U.S. PATENT DOCUMENTS

2006/0269886 A1* 11/2006 Musa ..................... B01D 53/34
                                                        431/326
2011/0225948 A1*  9/2011 Valeev .................. F23C 99/001
                                                        60/39.821
2015/0102115 A1*  4/2015 Collmer ............... B60H 1/2212
                                                        237/12.3 C

FOREIGN PATENT DOCUMENTS

| DE | 102011086979 A1 * | 5/2013 |
| DE | 10 2013 218847 A1 | 3/2015 |
| WO | 2015/123701 A1 | 8/2015 |

* cited by examiner

COMBUSTION CHAMBER ASSEMBLY UNIT

CROSS REFERENCE TO RELATED APPLICATIONS

This application claims the benefit of priority under 35 U.S.C. § 119 of German Application 10 2018 127 863.2, filed Nov. 8, 2018, the entire contents of which are incorporated herein by reference.

TECHNICAL FIELD

The present invention pertains to a combustion chamber assembly unit for a fuel-operated vehicle heater.

TECHNICAL BACKGROUND

A fuel-operated vehicle heater that can be used, for example, as a parking heater or as an auxiliary heater in a vehicle generally comprises a combustion chamber assembly unit with a combustion chamber provided therein. Combustion air and fuel are fed into the combustion chamber in order to generate an ignitable mixture of combustion air and fuel. In a combustion chamber assembly unit operating according to the principle of so-called vaporizing burners, the fuel is fed in the liquid state and distributed, among other things, by capillary delivery action in an evaporator medium, which is made of porous material, and discharged in vapor form into the combustion chamber on a side of the evaporator medium that is facing the combustion chamber. In order to support the discharge of fuel vapor especially during a start phase, a heating device that generally provides heat by electrical energization of a heat conductor is associated with such an evaporator medium. Further, an ignition element, which is generally provided in the form of a glow plug, is electrically energized and is thereby heated to a temperature sufficient for the ignition of the mixture, for example, in an area positioned in the combustion chamber, is provided for starting the combustion.

SUMMARY

An object of the present invention is to provide a combustion chamber assembly unit for a fuel-operated vehicle heater, in which the structural measures to be provided for supporting the fuel evaporation or/and for starting the combustion are provided in a technically simple, yet reliably acting manner, and the combustion taking place during the combustion operation is essentially not compromised by such structural measures.

This object is accomplished according to the present invention by a combustion chamber assembly unit for a fuel-operated vehicle heater, comprising a combustion chamber housing, a combustion chamber formed in the combustion chamber housing, a preferably porous evaporator medium for the absorption of liquid fuel and for the discharge of fuel vapor into the combustion chamber, a heating/ignition device for heating the evaporator medium or/and for igniting a mixture of fuel and combustion air formed in the combustion chamber, the heating/ignition device comprising at least one radiation source for the emission of electromagnetic radiation into the combustion chamber and at least one absorption body for the absorption of electromagnetic radiation emitted into the combustion chamber.

By using electromagnetic radiation and at least one absorption body absorbing this electromagnetic radiation, it becomes possible to provide the heating that is needed for supporting the evaporation and the locally very high temperature needed for igniting a mixture of fuel and combustion air, which is present in the combustion chamber, in a contactless manner in the area of the combustion chamber. In other words, no electrical lines leading into the combustion chamber have to be present and those structural measures, which are to be provided for the thermal interaction with the fuel to be evaporated or/and with the mixture of fuel and combustion air, can be provided in terms of their physical form such that they are optimized for this interaction, on the one hand, and compromise the flow forming in the interior of the combustion chamber as little as possible.

In case of the combustion chamber assembly unit configured according to the present invention, the combustion chamber housing may comprise a circumferential wall, which encloses a housing longitudinal axis and extends in the direction of the housing longitudinal axis, and a combustion chamber bottom, which is adjacent to the circumferential wall and defines the combustion chamber in the direction of the housing longitudinal axis. The evaporator medium may be arranged in this case overlapping the combustion chamber bottom or/and the circumferential wall in at least some areas on a side facing the combustion chamber.

It is especially advantageous if the evaporator medium provides an absorption body, especially in regard to the support of the fuel evaporation.

As an alternative or in addition, provisions may be made for at least one ignition body providing an absorption body to be provided at a spaced location from the evaporator medium in the combustion chamber, especially for providing locally high temperatures for starting the combustion. Such an ignition body may then be fully enclosed by the mixture of fuel and combustion air in the combustion chamber and thus provide a very efficient thermal interaction therewith.

For coupling electromagnetic radiation into the combustion chamber, at least one radiation source comprises a transmitter and a radiation unit for radiating electromagnetic radiation emitted by the transmitter into the combustion chamber.

In a configuration which guarantees both an efficient thermal uncoupling of a transmitter from the comparatively high temperatures in the area of the combustion chamber and a reliable coupling of electromagnetic radiation into the combustion chamber, the radiation unit may comprise a hollow pipe, wherein the hollow pipe is open for the emission of the electromagnetic radiation emitted by the transmitter into the combustion chamber. The fact that such a hollow pipe is open for the emission of electromagnetic radiation into the combustion chamber nevertheless does not mean that this pipe allows the discharge of combustion waste gas or of a mixture of fuel and combustion air formed in the combustion chamber in the direction towards the transmitter interacting with this hollow pipe. Such a hollow pipe may thus, in principle, be closed, for example, with a closing element made of quartz glass or the like, against the discharge of combustion waste gas or the like in the direction towards the transmitter with structural measures permeable to the electromagnetic radiation emitted by the transmitter.

It is proposed that at least one radiation source for the emission of electromagnetic radiation be arranged in the direction towards the combustion chamber bottom for an efficient coupling in of radiation.

Provisions may be made, for example, for at least one radiation source for the emission of electromagnetic radiation to be arranged with a main direction of radiation oriented towards the combustion chamber essentially in the direction of the housing longitudinal axis. In case of an embodiment allowing the positioning of the radiation source closer to the combustion chamber, at least one radiation source for the emission of electromagnetic radiation may be arranged with a main direction of radiation oriented towards the combustion chamber bottom bent at an angle in relation to the housing longitudinal axis.

In another alternative embodiment, it is proposed that at least one radiation source for the emission of electromagnetic radiation be arranged with a main direction of radiation oriented essentially at right angles to the housing longitudinal axis.

A configuration, which is advantageous for avoiding a compromise of the waste gas flow in the combustion chamber, may make it possible for at least one radiation source for the emission of electromagnetic radiation to be arranged in the direction away from the combustion chamber bottom.

Especially if the evaporator medium shall also be heated by the electromagnetic radiation in case of such a configuration, a reflector assembly may be provided for reflecting electromagnetic radiation emitted by the at least one radiation source in the direction towards the evaporator medium or/and towards at least one absorption body.

It is proposed that at least one radiation source for the emission of electromagnetic radiation be arranged with a main direction of radiation directed essentially towards at least one absorption body for an efficient utilization of the electromagnetic radiation coupled into the combustion chamber.

At least one absorption body may be made of silicon carbide (SiC) material, which can especially contribute to an efficient heating if at least one radiation source for the emission of electromagnetic radiation is configured with a frequency in the range of 300 MHz to 300 Ghz.

The present invention further pertains to a vehicle heater, comprising a combustion chamber assembly unit configured according to the present invention, further comprising a combustion air feed device for feeding combustion air to the combustion chamber as well as a fuel feed device for feeding liquid fuel to the evaporator medium.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
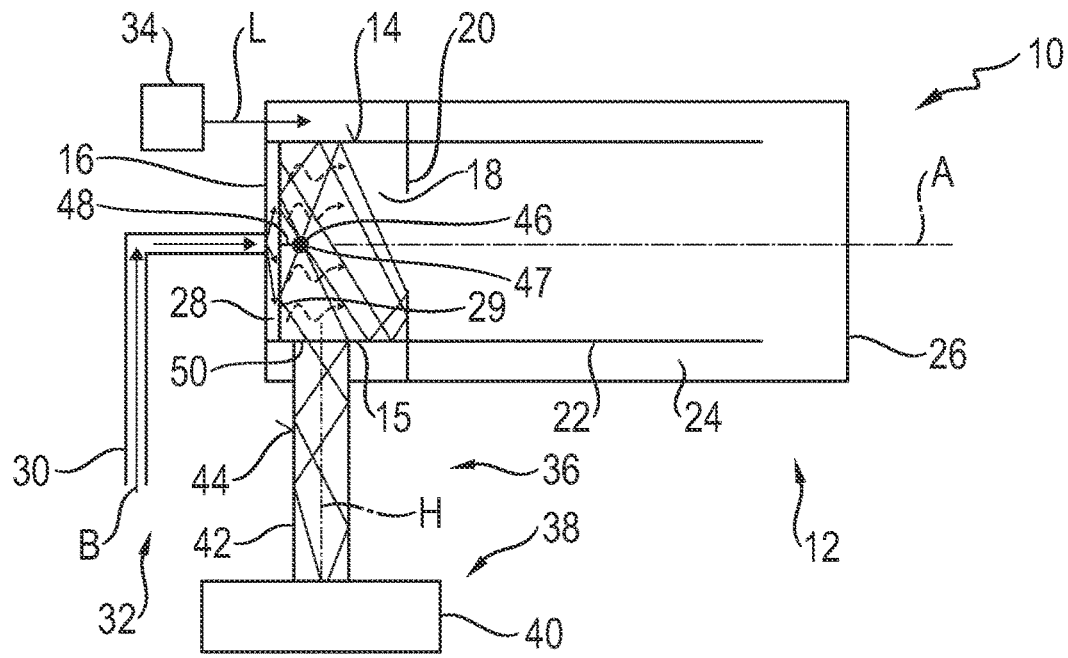
FIG. 1 is a schematic diagram of a vehicle heater.

Referring to the drawings, a vehicle heater that is shown schematically in FIG. 1 is generally designated by 10. The heater 10 comprises a combustion chamber assembly unit 12 with a combustion chamber housing which is generally designated by 14. The combustion chamber housing 14 is configured with a circumferential wall 15 enclosing a housing longitudinal axis A and elongated in the direction of the housing longitudinal axis A and with a bottom wall 16 adjacent to the circumferential wall 15. The circumferential wall 15 and the bottom wall 16 define a combustion chamber 18 that is open to a spatial area enclosed by a flame tube 22 via a flame diaphragm 20 and the opening formed therein. The flame tube 22 is adjacent to the circumferential wall 15 and may be configured, for example, as a single integral unit with the circumferential wall 15. At an axially open end of the flame tube 22, combustion waste gas generated in the combustion chamber 18 can be discharged from the flame tube 22 and is diverted into a waste gas backflow space 24, via which the generated combustion waste gas can flow to a waste gas outlet, not shown. The waste gas backflow space 24 may be defined outwardly by a heat exchanger housing 26, around which the medium to be heated, for example, a liquid, can flow on a heat exchanger housing outer side facing away from the waste gas backflow space 24.

In the exemplary embodiment being shown of the combustion chamber assembly unit 12, configured according to the principle of a vaporizing burner, a porous evaporation medium 28 is arranged at the bottom wall 16. A fuel feed line 30 of a fuel feed device generally designated by 32 opens into the combustion chamber housing 14 in the area of the bottom wall 16. The fuel B, which is fed in liquid form by a fuel pump, for example, a feed pump, of the fuel feed device 32, enters the porous evaporator medium 28 in the area of the bottom wall 16 and is distributed in the inner volume area of the evaporator medium 28, supported by a capillary delivery action generated by the porosity of the evaporator medium 28.

The combustion air L necessary for the combustion is introduced into the combustion chamber 18 by a combustion air feed device 34, for example, a blower, e.g., a side channel blower. Openings provided, for example, in the circumferential wall 15 can be used for this. The combustion air L, introduced into the combustion chamber 18, is mixed in the combustion chamber 18 with the fuel B being discharged as fuel vapor from the evaporator medium 28 and thus provides an ignitable mixture with this configuration.

It should be noted that the configuration of a combustion chamber assembly unit and of a vehicle heater was only explained above in regard to principle aspects. It is apparent that this configuration can be varied in a number of different ways.

In order to support the evaporation of the fuel B from the evaporator medium 28 and to provide the high temperatures needed for igniting the mixture of fuel B and combustion air L in the area of the combustion chamber 18, a heating/ignition device, which is generally designated by 36, is provided. The heating/ignition device 36 comprises a radiation source 38 for generating or for emitting electromagnetic radiation into the combustion chamber 18. The radiation source 38 comprises in turn a transmitter 40 generating the radiation as well as a radiation unit 44, which is configured as a hollow pipe 42 in the exemplary embodiment shown. As shown in FIG. 1, electromagnetic radiation emitted by the radiation source 38 in the form of a divergent radiation cone spreads out in the interior of the hollow pipe 42 essentially in the direction of a main direction of radiation H, which is at right angles to the housing longitudinal axis A in the example being shown and which also corresponds essentially to a direction of extension of the hollow pipe 42, possibly supported by a reflection at the inner surface of the hollow pipe 42. The radiation then enters the combustion chamber 18 and is partially also reflected at the surfaces defining this combustion chamber 18.

An absorption body 46 is carried at the bottom wall 16, for example, via a carrier structure 48 in the combustion chamber 18. The absorption body 46 provides an ignition body 47 and is positioned such that the main direction of radiation H is directed towards this absorption body 46. This means that the radiation emitted by the transmitter 40 or at least a large part of this radiation impinges on the absorption body 46 and is absorbed by same. This leads to the heating of the absorption body 46, especially to high temperatures such that the mixture of fuel and combustion air formed in the combustion chamber 18 is ignited, on the one hand. On the other hand, heat is transferred to the evaporator medium 28 by the absorption body 46, which is also positioned close to the evaporator medium 28, as a result of which the fuel evaporation is supported.

In coordination with the electromagnetic radiation emitted by the transmitter 40, the absorption body 46 is made of a material which is highly suitable for the absorption of this radiation. If, for example, a transmitter 40 which emits radiation in a frequency range of 300 MHz to 300 GHz, for example, about 2.45 GHz, is used, the absorption body 46 may be made of silicon carbide (SiC) or a material that contains silicon carbide or into which silicon carbide particles are embedded.

In order to allow the emission of the radiation emitted by the transmitter 40 in the direction of the combustion chamber 18, on the one hand, but to prevent the mixture of fuel and combustion air formed in the combustion chamber 18 or/and the combustion waste gas generated in the combustion chamber 18 from reaching the transmitter 40 via the hollow pipe 42, on the other hand, the hollow pipe 42 may be closed by a radiolucent closing element 50, for example, in its area adjacent to the combustion chamber 18. This closing element 50 may be made, for example, of quartz glass.

As an alternative or in addition to the provision of the absorption body 46 or ignition body 47 being shown in FIG. 1, the evaporator medium 28 may be used as an absorption body 29. For this, the evaporator medium 28 may be made of the material which absorbs radiation emitted by the transmitter 40 or may contain particles of this material as embedded particles. In particular, the evaporator medium 28 providing an absorption body 29 may be made of open-pore, foamed silicon carbide to provide the porous structure in this case. Also in the arrangement shown in FIG. 1, in which the main direction of radiation H is approximately at right angles to the housing longitudinal axis A and thus approximately parallel to the surface of the evaporator medium 28, which surface faces the combustion chamber 18, the radiation emitted from the hollow pipe 42 also reaches the area of the evaporator medium 28 directly or by reflection and can thus be absorbed by same. An essentially homogeneous heating of the evaporator medium 28 and a correspondingly homogeneous fuel evaporation are thus achieved in the combustion chamber 18.

Figure 2:
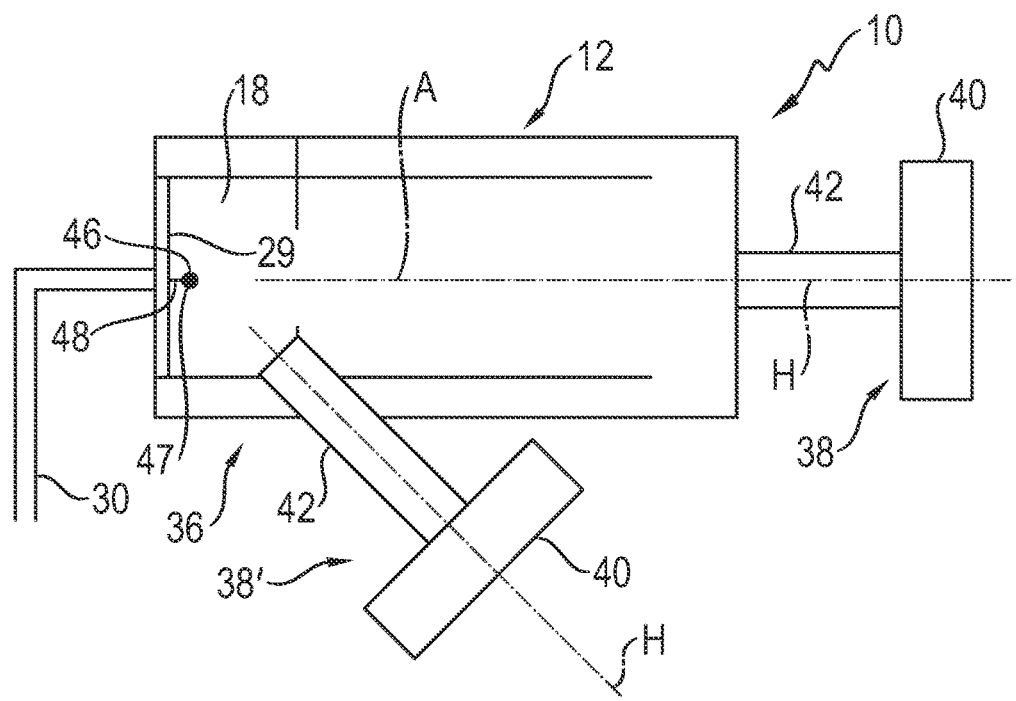
FIG. 2 is a view corresponding to FIG. 1 of an alternative type of configuration of a vehicle heater.

FIG. 2 shows alternative positionings of the radiation source 38 in relation to the combustion chamber housing 14. Thus, one of the radiation sources 38, 38' shown in FIG. 2 is positioned such that the main direction of radiation H thereof corresponds approximately to the direction of extension of the housing longitudinal axis A, so that the radiation emitted by the transmitter 40 is directed essentially towards the bottom wall 16 or towards the evaporator medium 28 provided on the bottom wall 16. This guarantees that the radiation emitted by the transmitter is admitted even more uniformly to the evaporator medium 28, so that the absorption body 46 shown in FIG. 2 may be omitted because of the functionality of an absorption body 29 provided by (incorporated into) the evaporator medium 28, and the functionality may also be provided by the evaporator medium 28 for igniting the mixture of combustion air and fuel provided in the combustion chamber 18.

With the radiation source 38', FIG. 2 shows another alternative positioning, in which the radiation source 38 is oriented such that the main direction of radiation H thereof is sloped (angled) towards the housing longitudinal axis A, so that, as well as in case of the radiation source 38 in FIG. 2, the electromagnetic radiation emitted in the respective main direction of radiation H is nevertheless directed towards the absorption body 46 and the evaporator medium 28, however, and thus can be efficiently used to heat the absorption body 46 or/and the evaporator medium 28.

Figure 3:
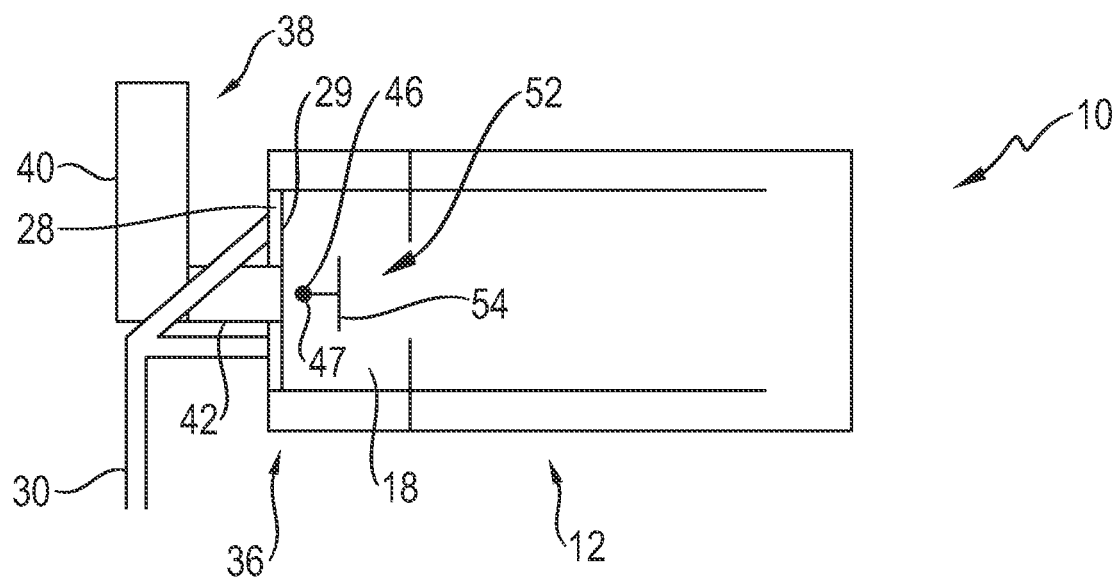
FIG. 3 is a view corresponding to FIG. 1 of an alternative type of configuration of a vehicle heater.

Another alternative embodiment is shown in FIG. 3. In this case, the radiation source 38 is positioned such that radiation is introduced into the combustion chamber 18 via the radiation unit 44 thereof or via the hollow pipe 42 in the area of the bottom wall 16 or of the evaporator medium 28, namely in the direction away from the bottom wall 16. The absorption body 46 is located opposite the opening of the hollow pipe 42, on the one hand, and a reflector assembly 52, which is also carried, for example, via the carrier device 48, is located opposite the opening of the hollow pipe 42, on the other hand. The electromagnetic radiation radiated from the hollow pipe 42 in the direction of the combustion chamber thus impinges on the absorption body 46 and is partially absorbed by same, on the one hand, and partially impinges on the reflector assembly 52 and is reflected by same both in the direction towards the absorption body 46 and in the direction towards the evaporator medium 28, on the other hand. In this embodiment as well, radiation can thus be absorbed not only by the absorption body 46, but also by the evaporator medium 28 and can be converted into heat in order to support the evaporation of fuel, on the one hand, and to provide the high temperature needed for the ignition, on the other hand.

The reflector assembly 52 may comprise a reflector 54, which is made of, for example, reflecting material, e.g., metallic material, which reflector 54, in coordination with the different functionalities, may also be shaped such that the electromagnetic radiation emitted from the hollow pipe 42 is reflected to where the emitted the electromagnetic radiation shall be used. If, for example, the absorption body 46 shall primarily be heated by radiation, then the reflector 54 may be configured like a parabolic reflector, in which the absorption body 46 is positioned at the focal point. If an as uniform as possible radiation or reflection shall also take place in the direction towards the evaporator medium 28, the reflector 54 may be configured with a reflection surface curved in the direction away from the bottom wall 16.

Figure 4:
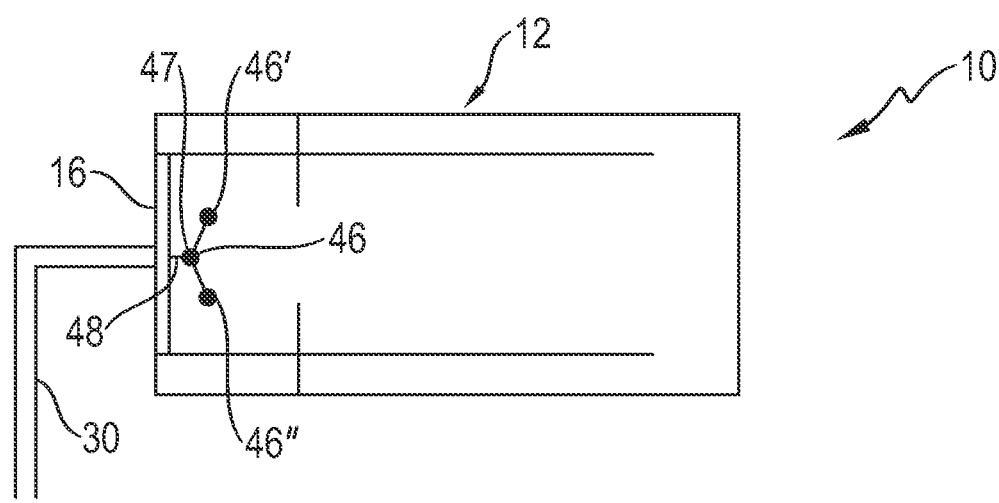
FIG. 4 is a view corresponding to FIG. 1 of an alternative type of configuration of a vehicle heater.

FIG. 4 shows a configuration, in which a plurality of absorption bodies 46, 46', 46" are arranged in the combustion chamber 18 and are carried via the carrier device 48 on one another or at the combustion chamber housing 14, especially at the bottom wall 16. By providing a plurality of such absorption bodies 46, 46', 46" in the combustion chamber 18, it becomes possible to provide very high temperatures at a plurality of areas simultaneously by heating the absorption bodies 46, 46', 46", so that a faster ignition or a more uniform propagation of flame can be guaranteed during the start phase. It is apparent that this configuration may be used with a plurality of absorption bodies 46, 46', 46" in the embodiments described above as well.

In case of the configuration of a combustion chamber according to the present invention, a contactless heating of those system areas, which shall support the evaporation of fuel or at which the high ignition temperatures needed for starting the combustion shall be provided, is guaranteed. The feeding of electrical lines or the positioning of comparatively large components, e.g., of a glow plug, in the interior of the combustion chamber are therefore not necessary.

The absorption body or the absorption bodies to be positioned in the combustion chamber may be configured such that they guarantee an efficient thermal interaction with the mixture of fuel and combustion air enclosing this combustion chamber, on the one hand, and do not compromise the flows generated in the interior of the combustion chamber to the greatest possible extent, on the other hand. For example, the absorption bodies or ignition bodies may be configured with a ball-like shape (ball shape) or drop-like shape (drop shape). Since the energy source used to provide the high temperatures, i.e., the transmitter, is located outside of the thermally highly stressed area, the functionality of ignition or heating is also not compromised over the service life of such a combustion chamber assembly unit.

The use of electromagnetic radiation for generating the temperatures needed for fuel evaporation or ignition supports not only a more homogeneous fuel evaporation due to a more uniform heating especially of the evaporator medium, which also contributes to a thermal relief of same, but also supports the burning off of deposits possibly generated during the combustion operation, especially of soot deposits in the area of the walls or components defining the combustion chamber.

A uniform evaporation of fuel may further be supported by the fuel fed via the fuel feed device to be fed into the evaporator medium via a plurality of fuel lines or branch lines at different positions, as this is shown in FIG. 3. This also reduces the influence of gravity on the distribution of the liquid fuel in the inner volume area of the evaporator medium.

While specific embodiments of the invention have been shown and described in detail to illustrate the application of the principles of the invention, it will be understood that the invention may be embodied otherwise without departing from such principles.

What is claimed is:

1. A fuel-operated vehicle heater combustion chamber assembly unit comprising:
a combustion chamber housing;
a combustion chamber formed in the combustion chamber housing;
an evaporator medium for an absorption of liquid fuel and for a discharge of fuel vapor into the combustion chamber; and
a heating/ignition device for heating the evaporator medium or/and for igniting a mixture of fuel and combustion air formed in the combustion chamber, the heating/ignition device comprising a radiation source for an emission of electromagnetic radiation into the combustion chamber and an absorption body for an absorption of electromagnetic radiation emitted into the combustion chamber.

2. The fuel-operated vehicle heater combustion chamber assembly unit in accordance with claim 1, wherein:
the combustion chamber housing comprises:
a circumferential wall, which encloses a housing longitudinal axis and extends in a direction of the housing longitudinal axis; and
a combustion chamber bottom, which is adjacent to the circumferential wall and defines the combustion chamber in the direction of the housing longitudinal axis; and
the evaporator medium is arranged overlapping the combustion chamber bottom, or the evaporator medium is arranged overlapping the circumferential wall in at least some areas on a side facing the combustion chamber, or the evaporator medium is arranged overlapping the combustion chamber bottom and overlapping the circumferential wall in at least some areas on a side facing the combustion chamber.

3. The fuel-operated vehicle heater combustion chamber assembly unit in accordance with claim 2, wherein the radiation source is arranged in a directed towards the combustion chamber bottom.

4. The fuel-operated vehicle heater combustion chamber assembly unit in accordance with claim 3, wherein the radiation source for the emission of electromagnetic radiation is arranged with a main direction of radiation oriented towards the combustion chamber bottom.

5. The fuel-operated vehicle heater combustion chamber assembly unit in accordance with claim 3, wherein the radiation source is arranged with a main direction of radiation oriented towards the combustion chamber bottom and at an angle in relation to the housing longitudinal axis.

6. The fuel-operated vehicle heater combustion chamber assembly unit in accordance with claim 2, wherein the radiation source is arranged with a main direction of radiation oriented essentially at right angles to the housing longitudinal axis.

7. The fuel-operated vehicle heater combustion chamber assembly unit in accordance with claim 2, wherein the radiation source is arranged directed away from the combustion chamber bottom.

8. The fuel-operated vehicle heater combustion chamber assembly unit in accordance with claim 1, wherein the absorption body is provided by the evaporator medium.

9. The fuel-operated vehicle heater combustion chamber assembly unit in accordance with claim 1, wherein the absorption body provides an ignition body and the ignition body is disposed in the combustion chamber at a spaced location from the evaporator medium.

10. The fuel-operated vehicle heater combustion chamber assembly unit in accordance with claim 1, wherein the radiation source comprises:
a transmitter; and
a radiation unit for radiating electromagnetic radiation, emitted by the transmitter, into the combustion chamber.

11. The fuel-operated vehicle heater combustion chamber assembly unit in accordance with claim 10, wherein:
the radiation unit comprises a hollow pipe;
the hollow pipe is open for the emission of the electromagnetic radiation emitted by the transmitter into the combustion chamber.

12. The fuel-operated vehicle heater combustion chamber assembly unit in accordance with claim 1, further comprising a reflector assembly for reflecting electromagnetic radiation, emitted by the radiation source, in a direction towards the evaporator medium or in a direction towards the absorption body or in a direction towards the evaporator medium and towards the absorption body.

13. The fuel-operated vehicle heater combustion chamber assembly unit in accordance with claim 1, wherein the radiation source for the emission of electromagnetic radiation is arranged with a main direction of radiation directed essentially towards the absorption body.

14. The fuel-operated vehicle heater combustion chamber assembly unit in accordance with claim 1, wherein:
   the absorption body is comprised of silicon carbide material; or
   the radiation source for the emission of electromagnetic radiation is configured with a frequency in the range of 300 MHz to 300 Ghz; or
   the absorption body is comprised of silicon carbide material and the radiation source for the emission of electromagnetic radiation is configured with a frequency in the range of 300 MHz to 300 Ghz.

15. A vehicle heater comprising:
   a fuel-operated vehicle heater combustion chamber assembly unit comprising:
   a combustion chamber housing;
      a combustion chamber formed in the combustion chamber housing;
      an evaporator medium for an absorption of liquid fuel and for a discharge of fuel vapor into the combustion chamber; and
      a heating/ignition device for heating the evaporator medium or/and for igniting a mixture of fuel and combustion air formed in the combustion chamber, the heating/ignition device comprising a radiation source for an emission of electromagnetic radiation into the combustion chamber and an absorption body for an absorption of electromagnetic radiation emitted into the combustion chamber;
   a combustion air feed device for feeding combustion air to the combustion chamber; and
   a fuel feed device for feeding liquid fuel to the evaporator medium.

16. The vehicle heater in accordance with claim 15, wherein:
   the combustion chamber housing comprises:
      a circumferential wall, which encloses a housing longitudinal axis and extends in a direction of the housing longitudinal axis; and
      a combustion chamber bottom, which is adjacent to the circumferential wall and defines the combustion chamber in the direction of the housing longitudinal axis; and
   the evaporator medium is arranged overlapping the combustion chamber bottom, or the evaporator medium is arranged overlapping the circumferential wall in at least some areas on a side facing the combustion chamber, or the evaporator medium is arranged overlapping the combustion chamber bottom and overlapping the circumferential wall in at least some areas on a side facing the combustion chamber.

17. The vehicle heater in accordance with claim 15, wherein the absorption body is provided by the evaporator medium.

18. The vehicle heater in accordance with claim 15, wherein the absorption body provides an ignition body and the ignition body is disposed in the combustion chamber at a spaced location from the evaporator medium.

19. The vehicle heater in accordance with claim 15, wherein the radiation source comprises:
   a transmitter; and
   a radiation unit for radiating electromagnetic radiation, emitted by the transmitter, into the combustion chamber.

20. The vehicle heater in accordance with claim 15, further comprising a reflector assembly for reflecting electromagnetic radiation, emitted by the radiation source, in a direction towards the evaporator medium or in a direction towards the absorption body or in a direction towards the evaporator medium and towards the absorption body.

* * * * *